Figure 1:
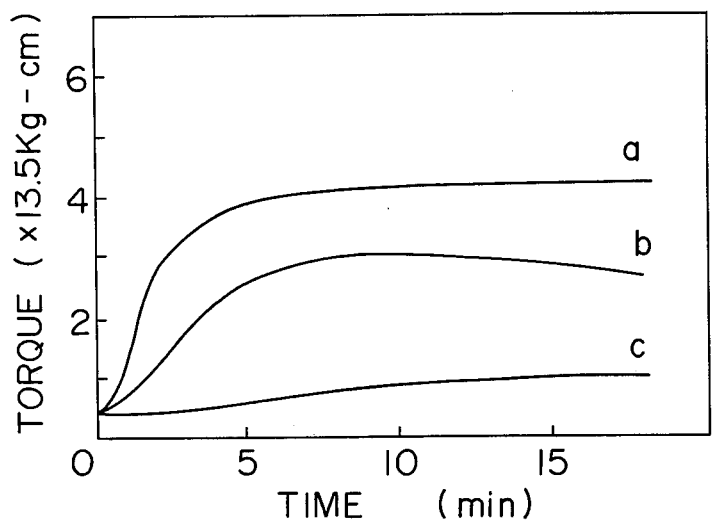

United States Patent [19]  [11] 4,032,479
Bunnomori et al.  [45] June 28, 1977

[54] CURED OR UNCURED RUBBER COMPOSITION CONTAINING HOMOPOLYMERS OR COPOLYMERS OF EPIHALOHYDRINS

[75] Inventors: Yukinari Bunnomori; Nobuo Yamada, both of Amagasaki; Tetsuya Nakata, Ibaraki, all of Japan

[73] Assignee: Osaka Soda Co., Ltd., Osaka, Japan

[22] Filed: June 18, 1976

[21] Appl. No.: 697,344

[30] Foreign Application Priority Data

Jan. 16, 1976 Japan ................................ 51-4290

[52] U.S. Cl. .................................. 260/2 A; 260/3; 260/75 T; 260/78.41; 260/874; 260/878 R; 260/887; 260/892

[51] Int. Cl.² ........................................ C08G 65/32

[58] Field of Search ............... 260/2 A, 78.41, 874, 260/75 T

[56] References Cited

UNITED STATES PATENTS

| | | | |
|---|---|---|---|
| 3,026,270 | 3/1962 | Robinson | 260/2 |
| 3,026,305 | 3/1962 | Robinson | 260/79.5 |
| 3,341,491 | 9/1967 | Robinson | 260/45.75 |
| 3,414,529 | 12/1968 | Green et al. | 260/2 |
| 3,726,841 | 4/1973 | Mirolli et al. | 260/79 |
| 3,790,524 | 2/1974 | Saito et al. | 260/45.8 N |
| 3,875,122 | 4/1975 | Mirolli | 260/78.41 |

OTHER PUBLICATIONS

Shimokawa et al., "Vulcanization of Epichlorohydrin Polymers," Chemical Abstracts 81, 79148h (1974).

*Primary Examiner*—Harold D. Anderson
*Assistant Examiner*—E. A. Nielsen
*Attorney, Agent, or Firm*—Sherman & Shalloway

[57] ABSTRACT

A cured or uncured rubber composition comprising 1. a rubber component about 1 to 100% of which consists of a homopolymer or copolymer of an epihalohydrin, 2. a curing amount of a curing agent therefor consisting of a salt of an ethylenically unsaturated monocarboxylic acid with 1,8-diazabicyclo(5,4,0) undecene-7 and an organic peroxide, and 3. an acid acceptor.

3 Claims, 4 Drawing Figures

CURED OR UNCURED RUBBER COMPOSITION CONTAINING HOMOPOLYMERS OR COPOLYMERS OF EPIHALOHYDRINS

This invention relates to cured or uncured rubbery compositions containing homopolymers or copolymers of epihalohydrins having greatly improved properties.

More specifically, the invention relates to cured or uncured compositions containing homopolymers or copolymers of epihalohydrins which demonstrate various improved properties such as satisfactory vulcanizing speeds at which the uncured composition is cured, good performance with respect to their property of preventing staining and corrosion of a mold and other metallic vessels used in the curing operation, good properties of the cured composition such as tensile strength and compression set, and superior performance in preventing corrosion when the cured composition is used in contact with metals.

In particular, it relates to an uncured or cured rubber composition comprising a homopolymer or copolymer of an epihalohydrin, or a mixture of the homopolymer or copolymer of epihalohydrin with another rubber, which uses a curing agent composed of a salt of 1,8-diazabicyclo(5,4,0)undecane-7 with a compound having one carboxyl group and at least one ethylenically unsaturated linkage whose utilization as a curing agent or a co-curing agent for rubber compositions has been unknown, and an organic peroxide which has been unable to be put to practical use as a curing agent for homopolymers or copolymers of epihalohydrins.

Some homopolymers or copolymers of epihalohydrins (hereinafter abbreviated often to epihalohydrin polymers), after being cured (vulcanized, i.e., crosslinked), are used commercially as a rubber material having desirable heat resistance and resistance to oils and various other unique properties. Various new proposals have been made in regard to the method of curing epihalohydrin polymers.

The cross-linking of the epihalohydrin polymer is believed to be the result of a reaction of the side-chain halogen contained in the molecule of the polymer, and a typical example of the curing method is disclosed in U.S. Pat. No. 3,026,305. The Patent suggests that the curing is accomplished by reacting sulfur or a certain class of organic sulfur compounds, such as tetramethylthiuram disulfide or 2-mercaptobenzothiazole, with the epihalohydrin polymer in the presence of a certain class of amines such as tri-n-butylamine, triethanolamine or dicyclohexylamine. As another suggestion, a method is known in which 2-mercaptoimidazoline or 2-mercaptopyrimidine and a specific metal compound such as red lead, magnesia, white lead or dibasic lead phosphite are used in combination (U.S. Pat. No. 3,341,491). Other curing methods are known in which a certain class of polyamine or a salt thereof such as ethylenediamine or hexamethylenediamine carbamate is used as a curing agent (U.S. Pat. No. 3,026,270), or in which a mercaptotriazine derivative such as 1-dibutylamino-3,5-dimercaptotriazine is used as a curing agent (Japanese Pat. Publication No. 36926/73).

Notwithstanding these various prior art suggestions concerning the curing of epihalohydrin polymers, the epihalohydrin polymer technology has been unable so far to provide a cured or uncured epihalohydrin polymer composition which possesses various desirable properties such as satisfactory vulcanization speeds, superior performance in preventing corrosion of metals, satisfactory tensile strength and compression set. This consequently has imposed numerous limitations on the utilization of epihalohydrin polymers which have excellent properties as a rubber material. It has been desired therefore to develop cured or uncured compositions of epihalohydrin homopolymers or copolymers possessing the foregoing properties to a satisfactory extent.

Some of the coinventors of the present application previously discovered that a satisfactory cured or uncured composition of a homopolymer or copolymer of an epihalohydrin can be prepared by using a combination of an acidic salt of a polybasic carboxylic acid with 1,8-diazabicyclo(5,4,0) undecene-7 or a mixture of a polybasic carboxylic acid and a neutral salt of 1,8-diazabicyclo(5,4,0)undecene-7 as a curing agent for epihalohydrin polymers and a specific metal compound as an acid acceptor (U.S. Pat. application Ser. No. 612,759 filed Sept. 12, 1975).

We have found that a salt of 1,8-diazabicyclo(5,4,0) undecene-7 with a compound having one carboxyl group and at least one ethylenically unsaturated linkage (to be sometimes abbreviated hereinbelow as a salt of DBU with an unsaturated monobasic carboxylic compound), which has not been suggested heretofore and in fact does not exhibit a crosslinking activity on epihalohydrin polymers when used alone, shows a superior crosslinking action under heat on epihalohydrin polymers (or rubbers), or mixed rubbers containing epihalohydrin polymers, for example, mixtures of epihalohydrin polymers with various unsaturated rubbers or peroxide-curable saturated rubbers when used in combination with organic peroxides, and can easily cure such rubbers or rubber mixtures. This discovery was quite unexpected in view of the fact that the crosslinking of the epihalohydrin polymers has been believed to be the result of a reaction of the side-chain halogen contained in the molecule of the polymers, and therefore, the crosslinking of an unsaturated rubber or a blend of an unsaturated rubber and an epihalohydrin polymer has been theoretically difficult.

The details of the reaction mechanism which will bring about the above unexpected result have not yet been made entirely clear. The inventors, however, presume that the monocarboxylic acid containing an ethylenically unsaturated group reacts with the epihalohydrin polymer to introduce the unsaturated group into the polymer, and that the double bond of the unsaturated group reacts with the crosslinking functional group of the peroxide to induce various crosslinkings together, such as the crosslinking of the molecules of the epihalohydrin polymer, the crosslinking between the molecule of the epihalohydrin polymer and the molecule of the blended rubber, and the crosslinking between the molecules of the blended rubber.

Thus, it has been found that without introducing a double bond into the polymer by copolymerization, the polymer is rendered crosslinkable with a peroxide by introducing an unsaturated group at the time of the crosslinking reaction, and the epihalohydrin polymers can be crosslinked under those conditions which can be utilized in peroxide-curable unsaturated rubbers; and further that the blends described above can also be crosslinked.

It was suggested previously that the crosslinking or curing of epihalohydrin polymer is carried out using a combination of a polyfunctional vinyl monomer and an organic peroxide (Japanese Pat. Publication No. 37334/73). This suggestion, however, was quite unsatisfactory, as will be described later on by reference to the accompanying drawings showing experimental results. According to the present invention, unexpected superior results can be obtained over the above suggestion.

It is an object of this invention therefore to provide a cured or uncured rubber composition of a homopolymer or copolymer of an epihalohydrin or a mixture of it with another rubber, which has improved properties described above that cannot be achieved by the conventional methods.

Other objects and advantages of the invention will become apparent from the following description.

According to this invention, there is provided a cured or uncured rubber composition comprising (1) a rubber component about 1 to 100% of which consists of a homopolymer or copolymer of an epihalohydrin, (2) a curing amount of a curing agent therefor consisting of a salt of an ethylenically unsaturated monocarboxylic acid with DBU and an organic peroxide, and (3) an acid acceptor and as an optional components, (4) additives such as fillers, reinforcing agents, plasticizers, lubricants, tackifiers, stabilizers, antioxidants, foaming agents, flame retardants or pigments.

The invention also provides a cured or uncured rubber composition which may further contain additives of the type described above, said composition comprising a. 100 parts by weight of a rubber component about 1 to 100% by weight, preferably at least about 5% by weight, more preferably at least about 10% by weight, of which consists of a homopolymer or copolymer of an epihalohydrin, b. about 0.5 to about 10 parts by weight, preferably about 1 to about 10 parts by weight, of a salt of 1,8-diazabicyclo(5,4,0)undecene-7 with a compound having one carboxyl group and at least one ethylenically unsaturated linkage, c. about 0.1 to about 20 parts by weight, preferably about 0.1 to about 10 parts by weight, more preferably about 0.1 to about 5 parts by weight of an organic peroxide, and d. about 1 to about 20 parts by weight, preferably about 1 to about 10 parts by weight, of a metal compound selected from the group consisting of oxides of metals of group II of the periodic table, hydroxides of metals of group II, carbonates of metals of group II, silicates of metals of group II, phosphites of metals of group II, carboxylic acid salts of metals of group II, oxides of metals of group IVa of the periodic table, basic carbonates of metals of group IVa, basic carboxylic acid salts of metals of group IVa, basic sulfites of metals of group IVa, basic phosphites of metals of group IVa, and basic sulfates of metals of group IVA.

The homopolymer or copolymer of an epihalohydrin used in this invention contains a halo-methyl group as a functional group. Examples of these epihalohydrin polymers are homopolymers of epihalohydrins such as polyeichlorohydrin and polyepibromohydrin and epihalohydrin copolymers. The epihalohydrin copolymers include, for example, an epichlorohydrin/epibromohydrin copolymer and copolymers of epihalohydrins with at least one comonomer selected from the group consisting of epoxide compounds and dicarboxylic acid anhydrides. Examples of the epoxides include coolymerizable epoxides such as ethylene oxide, propylene oxide, butylene oxide, styrene oxide, phenylglycidyl ether, allylglycidyl ether and glycidyl methacrylate. On the other hand, examples of the dicarboxylic anhydrides are 5-membered dicarboxylic acid anhydrides such as succinic anhydride, phthalic anhydride, itaconic anhydride, hexahydrophthalic anhydride and tetrahydrophthalic anhydride. These comonomers may be used either alone or in a suitable combination of two or more.

Advantageously, the copolymer derived from the epihalohydrin and the comonomer is one consisting of at least about 5 mole %, preferably at least about 10 mole %, more preferably at least about 20 mole %, and still more preferably at least about 40 mole %, of the epihalohydrin and the remainder being the comonomer. Specific examples of such copolymers include an epichlorohydrin or epibromohydrin/ethylene oxide copolymer, and epichlorohydrin or epibromohydrin/allylglycidyl ether copolymer, an epichlorohydrin or epibromohydrin/ethylene oxide/allylglycidyl ether copolymer, an epichlorohydrin or epibromohydrin/propylene oxide/allylglycidyl ether copolymer, an epichlorohydrin or epibromohydrin/succinic anhydride copolymer, an epichlorohydrin or epibromohydrin/ethylene oxide/succinic anhydride copolymer, an epichlorohydrin or epibromohydrin/propylene oxide/succinic anhydride copolymer and an epichlorohydrin or epibromohydrin/ethylene oxide/propylene oxide copolymer.

In the present invention, mixtures or blends of these polymers with other rubbers can be utilized, and they frequently afford favorable compositions.

The other rubbers may, for example, include natural rubbers and synthetic unsaturated rubbers, and peroxide-curable saturated rubbers. Examples of the synthetic unsaturated rubbers are a styrene/butadiene copolymer rubber (SBR), polybutadiene rubber (BR), polyisoprene rubber (IR), an ethylene/propylene/diene copolymer rubber (EPDM), polychloroprene rubber (CR), an acrylonitrile/butadiene copolymer ruber (NBR), an acrylonitrole/isoprene copolymer rubber (NIR), an acrylonitrile/butadiene/unsaturated carboxylic acid copolymer rubber (carboxylated nitrile rubber), chlorinated butyl rubber, or brominated butyl rubber. Examples of the peroxide-curable saturated rubbers are chlorinated polyethylene (CPE), chlorosulfonated polyethylene, acrylic rubbers comprising an acrylate ester as a main component, and an ethylene/propylene rubber.

In the rubber composition of this invention, a salt of DBU with a compound having one carboxyl group and at least one ethylenically unsaturated linkage is utilized as a curing agent or crosslinking agent. The salt may be incorporated in the form of a pre-formed salt in the composition of this invention, or formed in situ by incorporating an ethylenically unsaturated monocarboxylic acid and DBU therein.

The unsaturated monobasic carboxylic acid used to form the salt may be aliphatic, cycloaliphatic and aromatic monocarboxylic acids having an ethylenically unsaturated linkage, and acidic esters of polycarboxylic acids obtained by esterifying polycarboxylic acids partially with unsaturated alcohols leaving one carboxyl group, aS typified by half-esters of dibasic carboxylic acids with unsaturated alcohols. Specific examples of the unsaturated monocarboxylic acid are $C_3$–$C_{18}$ aliphatic unsaturated monocarboxylic acids such as acrylic acid, methacrylic acid, crotonic acid, oleic acid, elaidic acid, sorbic acid, or linolenic acid; cycloaliphatic unsaturated monocarboxylic acids such as Δ2,3-cyclohexanecarboxylic acid; and aromatic unsaturated monocarboxylic acids such as cinnamic acid or p-vinylbenzoic acid.

Examples of the half-esters formed between unsaturated alcohols and polycarboxylic acids include monoallyl succinate, monoallyl maleate, monoallyl phthalate, monoallyl tetrahydrophthalate, monoallyl hexahydrophthalate, monoallyl methylhexahydrophthalate, monoallyl dodecenyl succinate, monoallyl fumarate, monoallyl adipate, monoallyl azelate, methallyl phthalate, and methallyl tetrahydrophthalate. Diallyl trimellitate and triallyl pyromellitate can also be cited as examples of the half esters of polycarboxylic acids. In the present invention, carboxylic acids containing a hetero atom can also be used if only they are monocarboxylic acids containing an ethylenic double bond in the molecule, and do not impeded crosslinking reaction with peroxides to a practically significant degree. The DBU salts of these unsaturated carboxylic acids are preferably used in the form of a preformed salt, but the salt-forming components may be separately fed to a roll, for example, to form the salt in situ. In this case, DBU can be used as a salt-forming component not only as a free base, but also as a carbonate, cyanurate or carboxylate of DBU. Salts with phenolic substances can be utilized so long as they do not impede the crosslinking with peroxides. Selection of these types of DBU salts is effective for controlling the scorch time of the crosslinking composition.

The organic peroxide used together with the salt of DBU with an unsaturated monobasic carboxylic acid may be any organic peroxides containing an —O—O— bond in the molecule, for example, various organic peroxides called, for example, diacyl peroxides, peroxy esters, ketone peroxides, hydroperoxides, or dialkyl peroxides. Examples of the organic peroxides include tertiary butyl hydroperoxide, cumene hydroperoxide, dicumyl peroxide, 2,5-dimethyl-2,5-di(tertiary butyl peroxy)hexane, di-tertiary butyl peroxide, benzoyl peroxide, dilauroyl peroxide, 1,1-bis(tertiary butyl peroxy)-3,5,5-trimethylcyclohexane, tertiary butyl perbenzoate, 1,1-bis(tertiary butyl peroxy)-3,3,5-trimethylcyclohexane, α,α'-bis(tertiary butyl peroxy)diisopropylbenzene, 2,5-dimethylhexane-2,5-dihydroperoxide, and cyclohexanone peroxide.

In addition to the rubber component (a), the DBU salt (b) and the organic peroxide (c), the composition of this invention further contains an acid acceptor (d) which is a metal compound selected from the group consisting of oxides of metals of group II, hydroxides of metals of group II, carbonates of metals of group II, silicates of metals of group II, phosphites of metals of group II, carboxylic acid salts of metals of group II, oxides of metals of group IVa, basic carbonates of metals of group IVa, basic carboxylic acid salts of metals of group IVa, basic sulfites of metals of group IVa, basic phosphites of metals of group IVa, and basic sulfates of metals of group IVA.

Preferred oxides, hydroxides, carbonates, silicates, phosphites or carboxylic acid salts of the metals of group II are compounds of the group II metals such as Mg, Ca, Zn, Sr, Cd and Ba, and compounds of Mg, Ca, and Ba are frequently used. Specific examples of these group II metal compounds include magnesium oxide (magnesia), calcium oxide (quicklime), calcium hydroxide (slaked lime), barium oxide, zinc oxide (zinc white), magnesium carbonate, barium carbonate, strontium carbonate, calcium carbonate, calcium oleate, calcium citrate, calcium phosphite, and magnesium phosphite. On the other hand, preferred oxides, basic carbonates, basic carboxylic acid salts, basic sulfites and basic phosphites of the metals of group IVa are compounds of the group IVa metals selected from Si, Ge, Sn, and Pb, the Sn and Pb compounds being especially preferred. Specific examples of these compounds are triplubmic tetroxide (red lead), lead monoxide (litharge), stannic oxide, dibasic lead carbonate (white lead), dibasic lead phthalate, dibasic lead stearate, dibasic lead sulfite, and dibasic lead phosphite. These metal compounds, which are presumed to serve as acid acceptors, can be used either singly or in a combination of two or more. They may also be used in conjunction with other metal compounds that are known as acid acceptors.

In the composition of this invention, the ratio between the DBU salt (b) and the peroxide (c) can be varied over a wide range according, for example, to the presence of the other rubber, its amount or its type, and the preferred proportions of these can be eadily determined experimentally by taking these factors into consideration. Preferably, the peroxide (c) is used in an amount sufficient to open the ethylenic double bond of the salt (b), or an amount greater than it.

Various known additives can be incorporated in the rubber composition of this invention. Typical examples of these additives are reinforcing agents or fillers such as carbon black, white carbon, calcium carbonate, magnesium carbonate, barium sulfate, clay, diatomaceus earth and phenolic resins, softeners or plasticizers such as esters of various carboxylic acids or phosphoric acid, polyethers and paraffinic or aromatic hydrocarbons, lubricants, such as long-chain aliphatic carboxylic acids or long-chain aliphthalic carboxylates, tackifiers such as alkylphenolformaldehyde resins, cumarone resins, terpene resins and rosin, antioxidants such as phenol derivatives, amine derivatives, mercapto derivatives, dialkyldithiocarbamates and phosphorous acid esters, stabilizers such as organotin compounds and epoxy compounds, flame retardants such as antimony oxide and phosphoric acid esters, and pigments such as titanium dioxide.

The amount in which these additives are added can be suitably varied as desired. Most frequently, they are used in an amount, per 100 parts by weight of rubber component, or usually, say, about 1 to 100 parts by weight in the case of the fillers or reinforcing agents and the plasticizers or solfteners, 0.1 to 10 parts by weight in the case of the lubricants and tackifiers, 0.1 to 10 parts by weight in the case of the antioxidants and stabilizers.

In the preparation of the uncured composition of this invention, the components (b) to (d) and other additives can be blended in any desired sequence with the rubber component (a). Furthermore, there is no particular restriction on the means and procedures to be used to perform blending, but any means and procedures can be used which can afford a homogeneous composition. For example, blending can be performed using open rolls or various types of blenders, kneaders, and mixers either in a single step or in a plurality of steps. There is no particular restriction on the order of adding these components, but the organic peroxide (c) is preferably added after all of the other components have been added.

The curing of the uncured composition of this invention can be accomplished by heating the composition. The heating temperature, which can be chosen suitably, is usually from about 100° C. to about 200° C. While the heating time is suitably chosen according, for example, to the temperature and the amount of the crosslinking agent used, periods of from about 0.5 to about 60 minutes are most frequently used. The heat-curing need not be carried out in a single step but can be effected in many steps. For example, in order to achieve a still greater improvement of the physical properties of the cured composition, it can be subjected to a postcure treatment. The curing procedure may be any of the conventional procedures including, for example, pressurized heat-molding by means of molds, heat injection-molding, heating by means of a steam kettle, oil bath, sand bath, air bath, etc., or heating by infrared rays or microwaves.

Several comparative tests were performed to show the differences in effect between the crosslinking of an epichlorohydrin/ethylene oxide copolymer with a combination of a polyfunctional vinyl monomer and an organic peroxide, and that with a combination of the salt of DBU with an unsaturated monocarboxylic acid and an organic peroxide in accordance with this invention (cure curves of torque-time), and the results are shown in Table 1.

the crosslinkability of the comparative composition B was improved as compared with the comparative composition C. But the resulting cured product had reduced heat stability.

Figure 2:
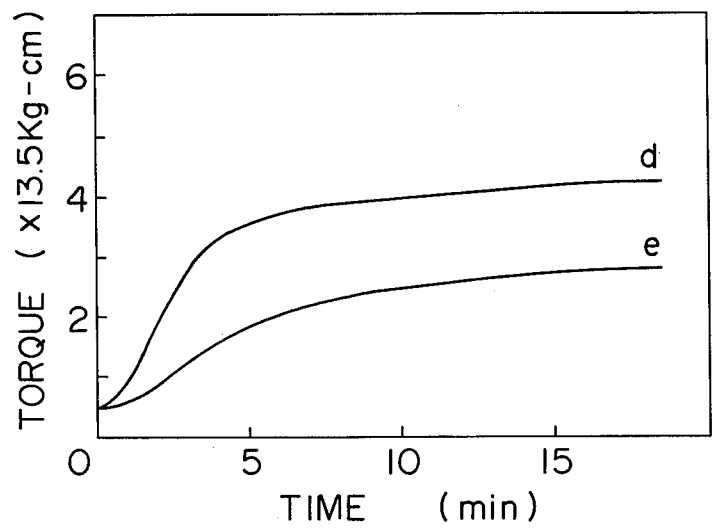

Tests were performed in the same manner as above using compositions of the following formulations. The cure curves obtained are shown in FIG. 2. It is clear from FIG. 2 that the composition of this invention (curve D) exhibits far better results than the comparative composition E (curve E) and the comparative composition F (curve F) in which only the peroxide was used as a curing agent. The formulations of these compositions are shown in Table 2.

Table 2

| Composition | Sample D (invention) | Sample E (comparison) | Sample F (comparison) |
| --- | --- | --- | --- |
| (a) Rubber component | Epichlorohydrin/ ethylene oxide copolymer (50 parts by weight) Acrylonitrile/butadiene copolymer (50 parts by weight) | Epichlorohydrin/ ethylene oxide copolymer (50 parts by weight) Acrylonitrile/butadiene copolymer (50 parts by weight) | Epichlorohydrin/ ethylene oxide copolymer (50 parts by weight) Acrylonitrile/butadiene copolymer (50 parts by weight) |
| (b), (c) Curing agent | DBU salt of sorbic acid (0.9 part by weight) 40% Dicumyl peroxide (4 parts by weight) | Triallyl isocyanurate (3 parts by weight) 40% Dicumyl peroxide (4 parts by weight) | None 40% Dicumyl peroxide (4 parts by weight) |
| (d) Acid acceptor | Red lead (5 parts by weight) | Red lead (5 parts by weight) | Red lead (5 parts by weight) |
| (e) Additives | | | |
| FEF carbon | 40 parts by weight | 40 parts by weight | 40 parts by weight |
| NBC | 1 part by weight | 1 part by weight | 1 part by weight |
| Lubricant | 1 part by weight | 1 part by weight | 1 part by weight |

The following Examples illustrate several modes of the compositions of this invention and their properties in greater detail.

EXAMPLES 1 TO 15 AND COMPARATIVE EXAMPLES 1 TO 4

An epichlorohydrin homopolymer (CHR) and an epichlorohydrin/ethylene oxide copolymer (CHC) were each used, and uncure compositions of CHR and of CHC having the formulations shown in Table 3 were prepared. These uncured compositions were each kneaded for 15 minutes on mixing rolls at 80° C. and formed into a sheet. The resulting uncured compositions were placed in molds and cured under the appli- Table 1

| Composition | Sample A (invention) | Sample B (comparison) | Sample C (comparison) |
| --- | --- | --- | --- |
| (a) Rubber component | Epichlorohydrin/ ethylene oxide copolymer (100 parts by weight) | Epichlorohydrin/ ethylene oxide copolymer (100 parts by weight) | Epichlorohydrin/ ethylene oxide copolymer (100 parts by weight) |
| (b), (c) Curing agent | DBU salt of sorbic acid (1,8 parts by weight) 40% Dicumyl peroxide (4 parts by weight) | Triallyl isocyanurate (3 parts by weight) 40% Dicumyl peroxide (10 parts by weight) | Triallyl isocyanurate (3 parts by weight) 40% Dicumyl peroxide (4 parts by weight) |
| (d) Acid acceptor | Red lead (5 parts by weight) | Red lead (5 parts by weight) | Red lead (5 parts by weight) |
| (e) Additives | | | |
| FEF carbon | 40 parts by weight | 40 parts by weight | 40 parts by weight |
| NBC as antioxidant | 1 part by weight | 1 part by weight | 1 part by weight |
| Lubricant | 1 part by weight | 1 part by weight | 1 part by weight |

Cure curves on compositions of the above formulations obtained by kneading the above ingredients on a 6-inch open roll were determined using a curelastomer (Model JSR) at 160° C. with an amplitude angle of 3°, and are shown in FIG. 1. It is evident from FIG. 1 that the composition in accordance with this invention (curve A) exhibits a far superior crosslinkability to the comparison B (curve B) and comparison C (curve C). In the comparison B, the amount of the peroxide was increased in order to raise the rate of crosslinking, and cation of pressure (80 kg/cm²), and heat (160° C.) for 20 minutes to obtain cured compositions. The properties of the cured compositions are shown in Table 4.

Figure 3:
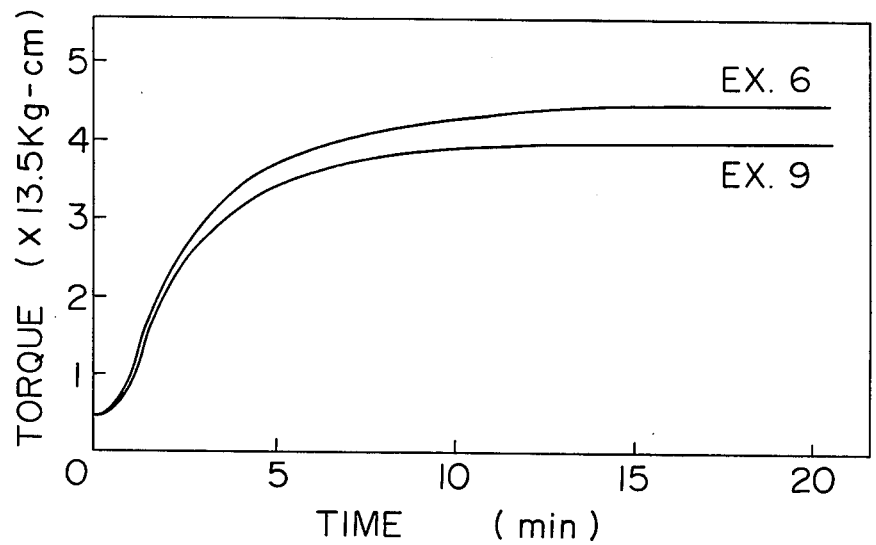
Figure 4:
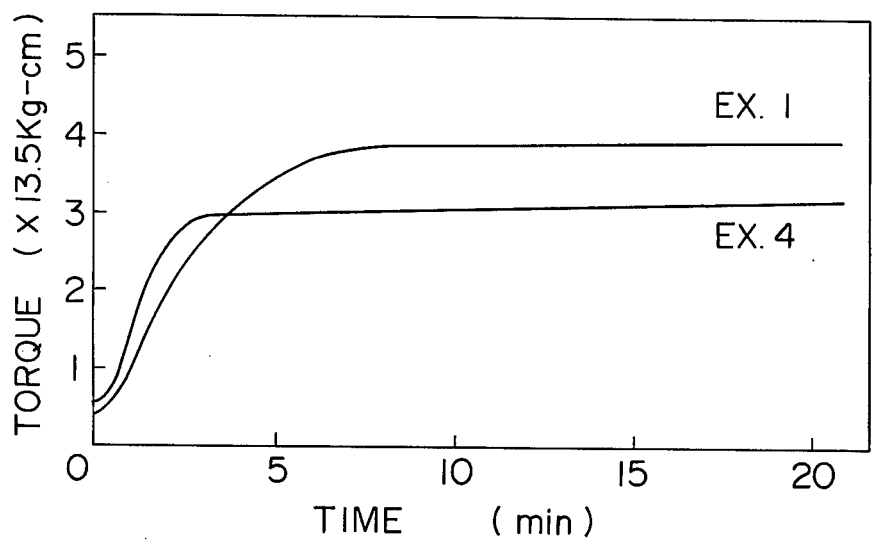

The cure curves of the compositions obtained in Examples 6 and 9 are shown in FIG. 3, and those of the compositions obtained in Examples 1 and 4, in FIG. 4. The cure curves were measured using a curelastometer (Model JSR) at 160° C. with an amplitude angle of 3°.

Table 3

| Composition | Examples 1 | 2 | 3 | 4 | 5 | 6 | 7 | 8 | 9 | 10 | 11 | 12 | 13 | 14 | 15 | Comparative Examples 1 | 2 | 3 | 4 |
|---|---|---|---|---|---|---|---|---|---|---|---|---|---|---|---|---|---|---|---|
| CHC *1 | 100 | | 100 | 100 | 100 | 100 | 100 | 100 | 100 | 75 | 50 | 25 | | 50 | 50 | 100 | 100 | 75 | 50 |
| CHR *2 | | 100 | | | | | | | | | | | 80 | | | | | | |
| NBR *3 | | | | | | | | | | 25 | 50 | 75 | | | | | | 25 | 50 |
| BR *4 | | | | | | | | | | | | | 20 | | | | | | |
| CPE *5 | | | | | | | | | | | | | | 50 | | | | | |
| ACM *6 | | | | | | | | | | | | | | | 50 | | | | |
| FEF *7 | 40 | 40 | 40 | 40 | 40 | 40 | 40 | 40 | 40 | 40 | 40 | 40 | 40 | 40 | 40 | 40 | 40 | 40 | 40 |
| Dioctyl tin stearate | 1 | 1 | 1 | 1 | 1 | 1 | 1 | 1 | 1 | 1 | 1 | 1 | 1 | 1 | 1 | 1 | 1 | 1 | 1 |
| Red lead | 5 | 5 | | | | | | 5 | 5 | 5 | 5 | 5 | 5 | 5 | 5 | 5 | 5 | 5 | 5 |
| Magnesia | | | 5 | | | | | | | | | | | | | | | | |
| Dibasic lead sulfite | | | | 5 | | | | | | | | | | | | | | | |
| Dibasic lead phosphite | | | | | 5 | | | | | | | | | | | | | | |
| Dibasic lead phthalate | | | | | | 5 | | | | | | | | | | | | | |
| Basic lead carbonate | | | | | | | 5 | | | | | | | | | | | | |
| DBU salt of acrylic acid *8 | 1.5 | | | | | | | | | | | | | | | | | | |
| DBU salt of sorbic acid *9 | | 1.8 | | 1.8 | 1.8 | | | | | 1.5 | 1 | 0.5 | 1 | 1 | 2 | | 1.8 | | |
| DBU salt of cinnamic acid *10 | | | 2 | | | | 4 | | | | | | | | | | | | |
| DBU salt of p-vinyl benzoic acid *11 | | | | | | | | 2 | | | | | | | | | | | |
| DBU salt of monoallyl succinate *12 | | | | | | | | | | | | | 1.6 | | | | | | |
| DBU salt of monoallyl phthalate *13 | | | | | | | | | 2 | | | | | | | | | | |
| Triallyl isocyanurate *14 | | | | | | | | | | | | | | | | | | | 3 |
| 40% Dicumyl peroxide *15 | 4 | 4 | 4 | | | 4 | 4 | 4 | 4 | 4 | 4 | 4 | 3 | | | | 4 | 4 | 4 |
| 1,1-bis(butylperoxy)-3,3,5-trimethylcyclohexane (40%) *16 | | | | 4 | | | | | | | | | | 4 | | | | | |
| 2,5-dimethyl-2,5-di-(t-butylperoxy)hexane (40%) *17 | | | | | 4 | | | | | | | | | | 3 | | | | |

Table 4

| Properties | Examples 1 | 2 | 3 | 4 | 5 | 6 | 7 | 8 | 9 | 10 |
|---|---|---|---|---|---|---|---|---|---|---|
| 100% Modulus (kg/cm²) | 30 | 25 | 20 | 29 | 28 | 39 | 22 | 27 | 26 | 41 |
| 200% Modulus (kg/cm²) | 65 | 58 | 48 | 62 | 63 | 89 | 50 | 62 | 65 | 101 |
| Tenacity at break (kg/cm²) | 37 | 133 | 124 | 140 | 140 | 158 | 129 | 144 | 149 | 168 |
| Elongation at break (%) | 455 | 410 | 550 | 400 | 410 | 360 | 480 | 470 | 455 | 310 |
| Hardness (Shore A) | 67 | 67 | 68 | 69 | 69 | 70 | 67 | 68 | 69 | 75 |
| Compression set (%) *18 | — | 41 | 48 | 47 | 35 | 48 | — | — | — | 41 |

| Properties | Examples 11 | 12 | 13 | 14 | 15 | Comparative Examples 1 | 2 | 3 | 4 |
|---|---|---|---|---|---|---|---|---|---|
| 100% Modulus (kg/cm²) | 42 | 35 | 44 | 35 | 36 | | | 25 | 18 |
| 200% Modulus (kg/cm²) | 115 | 94 | 98 | 78 | 110 | Not Cured | Not Cured | 53 | 25 |
| Tenacity at break (kg/cm²) | 202 | 212 | 175 | 138 | 125 | | | 79 | 75 |
| Elongation at break (%) | 360 | 400 | 310 | 450 | 255 | | | 320 | 750 |
| Hardness (Shore A) | 75 | 75 | 76 | 76 | 65 | — | — | 64 | 67 |
| Compression set (%) *18 | 38 | 37 | — | 68 | 63 | — | — | 63 | — |

Note
*1 Epichlorohydrin homopolymer (supplied by Osaka Soda)
*2 Epichlorohydrin/ethylene oxide copolymer (supplied by Osaka Soda)
*3 JSR N220S (supplied by Japan Synthetic Rubber Co., Ltd.)
*4 Nippon BR 1220 (supplied by Japanese Zeon Co., Ltd.)
*5 DAISOLAC MR104 (supplied by Osaka Soda)
*6 Chlorinated acrylic rubber N1095 (supplied by Nippon Oilseal Co., Ltd.)
*7 Seast 116 (supplied by Takai Denkyoku K.K.)
*8 Acrylic acid/DBU molar ratio = 1:1
*9 Sorbic acid/DBU molar ratio = 1:1
*10 Cinnamic acid/DBU molar ratio = 1:1
*11 p-Vinyl benzoic acid/DBU molar ratio = 1:1
*12 Monoallyl succinate/DBU molar ratio = 1:1
*13 Monoallyl phthalate/DBU molar ratio = 1:1
*14 Triallyl isocyanurate (TAIC) (supplied by Nippon Chemical Co., Ltd.)
*15 Percumyl D-40 (supplied by Nippon Yushi K.K.)
*16 Perhexa 25B-40 (supplied by Nippon Yushi K.K.)
*17 Perhexa 3M-40 (supplied by Nippon Yushi K.K.)
*18 Compressed 25% at 120° C. for 70 hours

What we claim is:

1. A cured or uncured rubber composition comprising
   a. 100 parts by weight of a rubber component about 1 to 100% by weight of which consists of an epihalohydrin homopolymer, a copolymer of an epihalohydrin with at least one other epihalohydrin, or a copolymer of an epihalohydrin with at least one comonomer selected from the group consisting of epoxide compounds and dicarboxylic acid anhydrides,
b. about 0.5 to about 10 parts by weight of a salt of 1,8-diazabicyclo(5,4,0)undecane-7 with a compound having one carboxyl group and at least one ethylenically unsaturated linkage,
c. about 1 to about 20 parts by weight of an organic peroxide, and
d. about 1 to about 20 parts by weight of a metal compound selected from the group consisting of oxides of metals of group II of the periodic table, hydroxides of metals of group II, carbonates of metals of group II, silicates of metals of group II, phosphites of metals of group II, carboxylic acid salts of metals of group II, oxides of metals of group IVa of the periodic table, basic carbonates of metals of group IVa, basic carboxylic acid salts of metals of group IVa, basic sulfites of metals of group IVa, basic phosphites of metals of group IVa, and basic sulfates of metals of group IVA.

2. The composition of claim 1 wherein said compound having one carboxyl group and at least one ethylenically unsaturated linkage is an aliphatic unsaturated monocarboxylic acid.

3. The composition of claim 1 wherein said compound having one carboxyl group and at least one ethylenically unsaturated linkage is a monoallyl ester of a dicarboxylic acid.

* * * * *